Nov. 17, 1931.  J. E. NIXON  1,832,727
FISH CATCHING DEVICE
Filed June 27, 1930
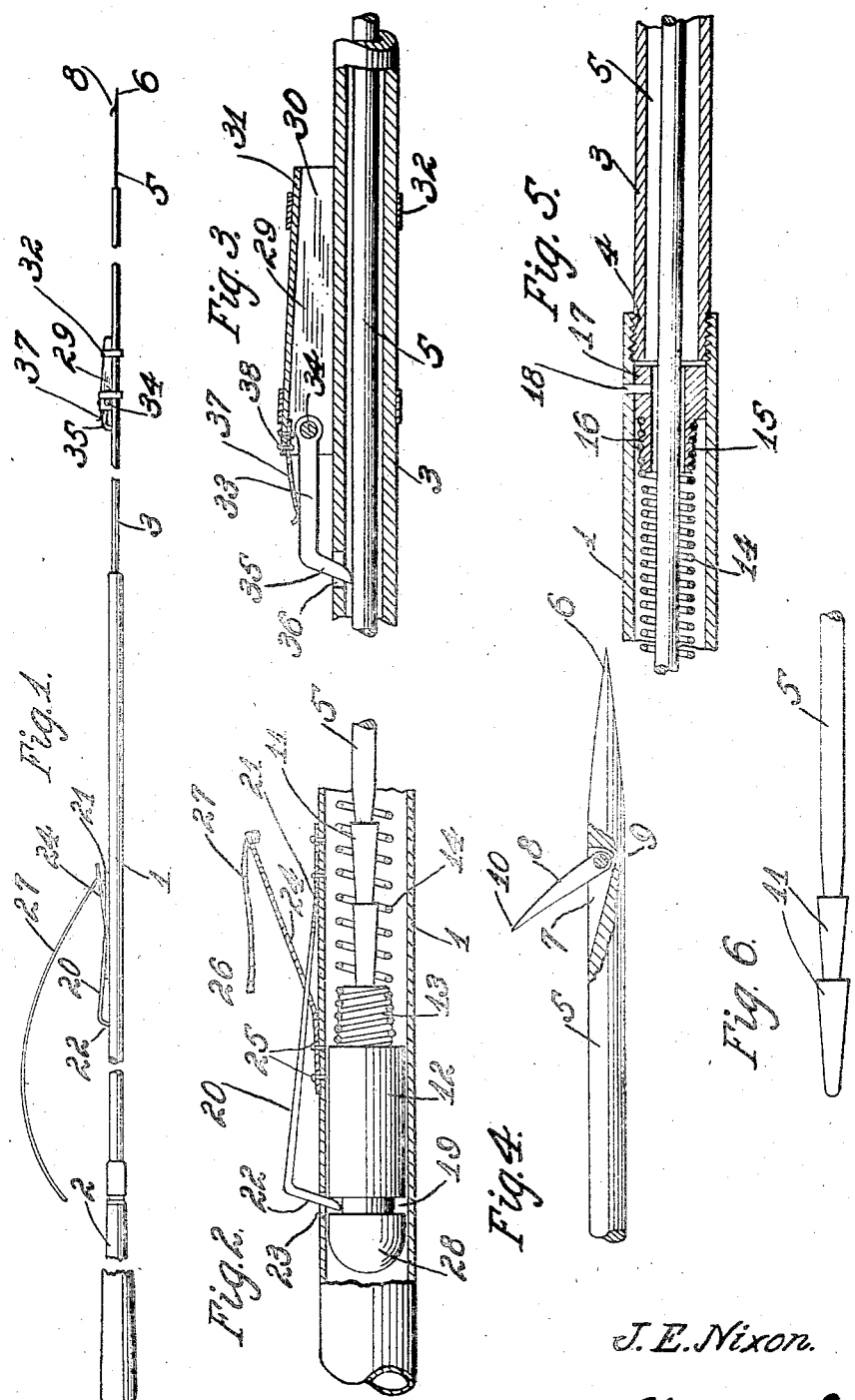
INVENTOR
J. E. Nixon.
BY Victor J. Evans
ATTORNEY
WITNESS: George L. Ogle.

UNITED STATES PATENT OFFICE

JESSIE E. NIXON, OF NICEVILLE, FLORIDA

FISH CATCHING DEVICE

Application filed June 27, 1930. Serial No. 464,336.

This invention relates to a novel fish catching device and more particularly to one of the type embodying a barrel and a spear housed within the barrel, and the primary object of the present invention is to provide a very compact and convenient arrangement of the component parts of the device so that the parts may be telescoped, and the device thus reduced to a very compact form.

Another object of the invention is to provide a fish catching device including a barrel provided at one end with a handle and a spear which is slidably mounted in the barrel, a spring being arranged within the barrel and connected with the spear so as to forcibly and quickly project the spear to full extended position beyond the end of the barrel when the device is directed at a fish, the spear, at its forward end being so constructed as to insure of the fish, which it penetrates, being caught.

Another object of the invention is to provide novel means for limiting the sliding movement of the spear within the barrel in each direction.

This invention also consists in certain other features of construction and in the combination and arrangement of the several parts, to be hereinafter fully described, illustrated in the accompanying drawings, and specifically pointed out in the appended claim, it being understood of course that minor changes may be made so long as they fall within the scope of the claim.

In describing my invention in detail, reference will be had to the accompanying drawings, wherein like characters denote like or corresponding parts throughout the several views, and in which:

Figure 1 is a view in side elevation of the device embodying the invention, parts being broken away to permit of illustration of the device on a larger scale.

Figure 2 is a detail fragmentary view partly in side elevation and partly in longitudinal section, illustrating the means for holding the spear of the device retracted and the trigger means, and the means for actuating the same.

Figure 3 is a view similar to Figure 2, illustrating a means provided for arresting the movement of the spear at the forward limit of its movement.

Figure 4 is a view partly in side elevation and partly in section illustrating the forward end of the spear of the device.

Figure 5 is a longitudinal sectional view, of a fragmentary character, illustrating the means for holding one end of a spring of the device within the barrel.

Figure 6 is a detail side elevation of the rear end of the spear.

The device embodying the invention includes a tubular barrel 1 which is provided at one end with a handle member 2 whereby the device may be conveniently manipulated. The barrel 1 is preferably formed in two sections, and the other section of the barrel is indicated by the numeral 3 and is exteriorly threaded at one end as at 4 and fitted into the threaded forward end of the first described barrel section. The sections 1 and 3 are preferably of substantially the same length.

The spear is indicated by the numeral 5 and preferably is in the form of a slender steel rod, which, at its forward end is provided with and tapered to a sharp piercing point 6 and, inwardly of this point the rod is formed with a recess 7 and a gaff 8 is pivotally mounted as at 9 in the tapered end of the recess, the recess being of gradually decreasing depth from its forward end to its rear end, and the spur being tapered toward its rear end so as to provide a sharp piercing point 10. This gaff will normally assume a position housed within the recess 7 but, at the moment of impact of the pointed end 6 of the spear with the body of a fish, the force of impact as well as the sudden arresting of the forward motion of the spear 5, will cause outward swinging movement of the gaff 8 about its pivot so that, when the spear is retracted by a backward pull upon the handle 2 of the device, it will enter the body of the fish and be securely anchored therein, thereby insuring of withdrawal of the spear from the fish body. At its rear end the spear 5 is formed with two substantially frusto-conical portions 11, the major ends of which are presented forwardly and the major ends of these portions constitute abutments to engage against an arresting member to be presently described, when the spear 5 is impelled in a forward direction.

Also for a purpose to be presently explained, the spear 5 is formed at its rear end with a substantial, cylindrical head 12 connected with the minor end of the rear one of the portions 11 against a helical corrugated stem portion 13, and the spring by which the spear is projected is indicated in the drawings by the numeral 14 and has a tension spring, and its rear end coils are engaged with the corrugations of the stem portion 13.

The spring extends longitudinally within the barrel 1 and the coils of the spring at the forward end thereof are engaged with corrugations 15 similar to the corrugations 13, and formed upon the cylindrical rearward extension 16 of a head 17 which is arranged in the forward end of the said section 1 of the barrel and held in place by a radial stud 18. The spring 14, being a tension spring, tends to hold the spear 5 in its forwardly shifted position, and in order that the spear may be held in retracted position, against the tension of the said spring 14, until the device has been presented in a direction in which a fish is to be speared and caught, a circumscribing groove 19 is formed in the head 12 and a trigger 20 which may be in the form of a resilient wire or strip is secured at its forward end as at 21, by small rivets or the like to one side of the barrel 1 and, from its attached end, the trigger 20 extends rearwardly at an acute angle and is provided at its rear end with an inwardly directed finger 22 which engages through an opening 23 formed in the barrel member 1 and, in the retracted position of the spear and the head 12 thereof, to the position shown in Figure 2, this portion 22, engages at its free end in the groove 19.

In order that the trigger 20 may be sprung outwardly so as to disengage the end of this portion 22 from the groove 19 in the head 12, a leaf spring 24 is secured by rivets or other means at one end as indicated by the numeral 25 to the barrel section 1, and is formed with a slot 26 through which the shank of the trigger 20 engages, this slot 26 being a longitudinal slot and the spring 24 being sprung laterally away from the barrel 1 and having connected to it at its forward end a flexible line 27 which may be led to the handle member 2 and either provided with a finger ring or in any other manner rendered readily engageable by the hand of the user of the device, so that when a pull is exerted upon the line 27, the spring 24 will be sprung outwardly thus effecting an outward springing of the trigger 20, due to the riding of the inner end wall of the slot 26 against the inner side of the trigger 20, and in this manner, the head 12 is released and the spring 14 will then forcibly and quickly project the spear in a forward direction to spear the fish toward which the device is presented. When the pull upon the line 27 is released, the spring 24 will of course swing inwardly toward the barrel section 1 and the resilient trigger 20 will then have its portion 22 projected through the opening 23, and into the said barrel section. In order that when the spear is slid rearwardly through the barrel sections 1 and 3, the trigger 20 may be reengaged with the groove in the head 12, the latter end of the said head is made of spherical form as indicated by the numeral 28 and will therefore ride against the inner end of the portion 22 of the trigger to spring the trigger outwardly until the groove 19 is in alignment with the opening 23.

The stop member for coaction with the major ends of the portions 11 of the spear 5 is shown in detail in Figure 3 of the drawings, and the same comprises a frame member 29 having side portions 30 and a back portion 31, the side of the casing opposite the back portion 31 being disposed in contact with the barrel section 3, and collars 32 being secured about the said casing 29 and the said barrel section 3 to hold the casing in place. The stop member is indicated by the numeral 33 and is pivoted at its rear end as at 34 within the rear end of the casing 29, and the member is provided with a bill 35 which projects through an opening 36 formed in the barrel member 3 and a leaf spring 37 is secured at one end as at 38 to the inner side of the back portion 31 of the casing and bears at its free end against the outer side of the stop member 33 and yieldably holds the end of the bill 35 in engagement with the spear 5. The said extremity of the bill 35 will therefore be in the path of movement of the major ends of the portions 11 of the spear 5 so that the said end of either portion may abut the end of the bill 35 thereby arresting the motion of the spear.

What I claim is:

A fishing spear comprising alined inner and outer barrel sections, a head fixed in the inner barrel section a head slidable in the inner barrel section, a coil spring connected with both of said heads, the slidable head having an annular groove, a trigger mounted upon the inner barrel section and adapted to engage in said groove, a spear shaft having shoulders, said shaft adapted to pass through the fixed head and abut against the movable head and a spring pressed stop member mounted upon the outer barrel section and adapted to engage the shoulders of the shaft.

In testimony whereof I affix my signature.

JESSIE E. NIXON.